United States Patent Office 3,227,311
Patented Jan. 4, 1966

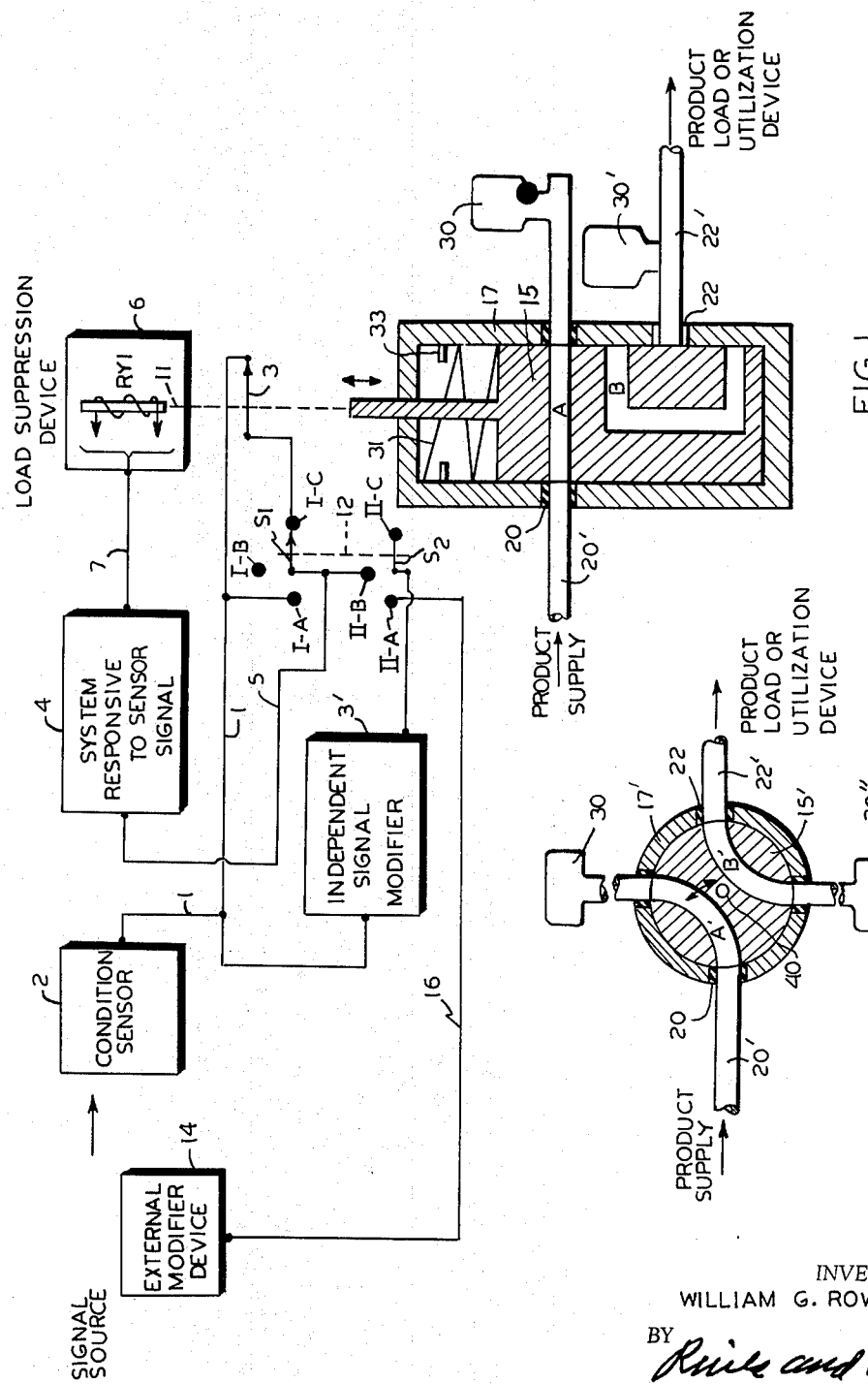

3,227,311
FAIL-SAFE PRODUCT DELIVERY SYSTEM
William G. Rowell, Quincy, Mass., assignor to Scully Signal Company, Melrose, Mass., a corporation of Massachusetts
Filed Sept. 28, 1962, Ser. No. 226,852
8 Claims. (Cl. 222—52)

The present invention relates to product-delivery systems, and, more specifically, to fail-safe valving and associated control circuits or other apparatus in which product delivery can not be falsely effected through failure of the valving apparatus or any of the components of the control circuits or devices therefor.

In United States Letters Patent Nos. 2,798,213, 2,798,-214, 2,807,007, 2,807,009, 2,807,010 and 2,807,011, and in articles by William G. Rowell et al entitled, "Fail-Safe Gets New Meaning," Control Engineering, March, 1956, pages 78 through 81, and "Fail-Safe Monitoring," Electronic Design, March 1, 1956, pages 28 through 31, systems and techniques for producing the fail-safe operation of electrical, electronic, mechanical and electro-mechanical systems are set forth. In the ouput of such systems, there is usually provided a switching apparatus that recurrently operates, in response to a repetitive checking signal of a predetermined rate or rates, to maintain a relatively slowly responding load in an operative or inoperative condition so long as the switching operation continues. The ultimate load-responsive device may, for example, comprise a valve for the delivery of some product, such as oil, liquid chemicals or other fluent materials, so long as the system is properly operative. Failure of any of the electrical, mechanical or other components in the system would produce improper operation of the ouput switching apparatus and, in turn, would result in rendering the ultimate load device inoperative, indicating a failure in the system and, in the case of product delivery, shutting off the load valve.

As valves and other ancillary equipment are added to the load or output side of such fail-safe control systems, however, the danger of unsafe failure of the valves themselves, such as sticking of the same, may exist, permitting, for example, undesired delivery of a product even though the control system is improperly operated and such fact has been indicated in the output circuit by the fail-safe apparatus.

It is to the problem of causing product-delivery devices, hereinafter generically termed valving means, to self-check themselves in order to fail in a safe manner, that the present invention is accordingly directed.

A further object of the invention is to provide a new and improved fail-safe combination and technique embodying product-delivery valving means and the like and control circuits or other control apparatus therefor that shall be completely fail-safe.

Still an adidtional object is to provide a novel fail-safe valving mechanism and associated apparatus of more general utility, also.

In summary, in one of its important aspects, the invention contemplates fail-safe product-delivery valving means having, in combination, a valve inlet for receiving the product from a source thereof, a valve outlet for delivering product from the valving means to a product utilization device, product storage means, position-orientable passage means intermediate the said inlet and outlet and shaped to permit connection between the inlet and the storage means in a first position and connection between the storage means and the outlet in a second position but preventing any direct communication through the passage means between the inlet and outlet, and means for repetitively changing the orientation of the passage means between the said first and second positions. Preferred constructional details and combinations and other and further objects of invention will be explained hereinafter, and will be more particularly delineated in the appended claims.

The invention will now be described in connection with the accompanying drawing, FIG. 1 of which is a combined block circuit diagram and longitudinal section of apparatus of preferred form in which the valving means is controlled by a preferably, though not essentially, electrical control circuit; and FIG. 2 is a longitudinal section of a modified fail-safe valving apparatus.

Referring, first, to FIG. 1, a system is therein disclosed in which an element 2, labelled "Condition Sensor," is provided for detecting any signal, event or condition that it is desired to monitor or receive and for passing an electrical signal indication thereof to a system 4, labelled "System Responsive to Sensor Signal." The condition sensor 2 may comprise any kind of detecting device, such as, for example, a light-sensing element, a heat-sensing element, an electro-mechanical transducer, a force- or pressure-sensing element, a current- or voltage-sensing element, or any other type of monitoring or receiving device, as explained in said patents and the said articles. The system 4 may be any kind of receiving, amplifying or transmission system and the like. The connection from the condition sensor or detector 2 to the left-hand side or input of the system 4 is shown provided by means of a conductor 1, a switch 3 and a conductor 5, through a contactor I–C and a switch $S_1$. The signal, event or condition detected by the condition sensor 2 and thus fed to the input of the system 4 may be termed the principal signal. There will therefore appear at the right-hand or output side of the system 4, along the conductor 7, an output signal that results from the transmission of the principal signal through the system 4 between its input and output. Connected with the output conductor 7 is a load-suppression device 6 indicated schematically as comprising a relay RY1, the armature of which, indicated by the vertical dotted line 11, controls not only the before-mentioned switch 3, but, also, a slidable or oscillatory valve shutter member 15, later described. The advent of the principal signal in the output conductor 7, resulting in the energizing of the coil of the relay RY1, causes the relay armature 11 to open the switch 3. This opens the connection between the conductors 1 and 5 and thus the connection between the condition sensor 2 and the system 4. Such a break in the input circuit results in modifying, modulating or chopping the principal signal in the input to the system 4 so that the principal signal no longer appears in the output conductor 7. The relay RY1 accordingly becomes thereupon de-energized and its armature again drops, as under the influence of gravity, closing the switch 3 thus to restore the feeding of the principal signal to the input of the system 4 from the condition sensor 2 by way of the conductor 1, the closed switch 3 and the conductor 5. This feed-back or reaction from the output to the input of the system 4 is thus caused to occur periodically at a predetermined repetition rate or rates, providing, in effect, a repetitive modification interruption of the principal signal flowing through the system 4 between its input and output. So long as this oscillating reactive effect between output and input takes place, the relay RY1 will continue to recover the signal modifications at the said repetition rate or rates and continue to modify the principal signal at that rate or rates. The system 4 will thus be maintained in periodic checking operation. Simultaneously therewith, the valve shutter member 15 will repetitively oscillate up and down within the valve housing 17 for a purpose subsequently explained.

It is not necessary, though it is preferred for purposes of simplicity and economy, that the feed-back control of FIG. 1 be utilized. As explained in the previously mentioned patents and articles, the signal modifications may be introduced by means of an independent signal modifier 3' placed, for example, between the condition sensor 2 and the input of the system 4, as by moving switch $S_1$ to the open contactor I-B and simultaneously, through the preferably ganged connection 12, moving a switch $S_2$ from open contactor II-C to contactor II-B that is connected with conductor 5. Again, however, the recovery of the signal modifications in the output load-suppression device 6, will maintain a load energized so long as the modifications, produced by the independent signal modifier 3', are present at the output of the system 4. If desired, moreover, the signal reaching the condition sensor 2 may already be provided with a checking-signal modification, as when the signal modifier 3' operates a shutter or other external modifier device 14 with the switch $S_2$ moved into engagement with contactor II-A (connected by conductor 16 to the modifier device 14), and switch $S_1$ engages contactor I-A directly to connect the condition sensor 2, by way of conductor 1, contactor I-A, switch $S_1$, and conductor 5, to the system 4.

The valve housing 17 is provided with an inlet port 20 and an outlet port 22 that are respectively provided, in turn, with inlet and outlet conduits 20', 22' for the application of the fluent or other product from a source of supply, labelled "Product Supply," and for the delivery of product to a load, labelled "Product Load or Utilization Device," respectively. The shutter 15 is provided with a first straight-through passage A and a lower C-shaped passage B; the passage A connecting the inlet 20 to a first product storage branch 30 when the valve shutter 15 is oriented to its illustrated downward position (as maintained by spring 31), corresponding to the illustrated closed position of the before-described switch 3, and the passage B connecting the storage branch 30 to the outlet 22 when the relay RY1 causes its armature 11 to orient the shutter 15 upward against the limit stop 33. It will be observed, however, that there is never any direct communication possible between the inlet 20 and the outlet 22.

In operation, therefore, the storage member 30 stores product from the inlet 20, via passage A, at the time the valve shutter 15 is in the illustrated downward position; and the storage member 30 delivers stored product, via passage B, to the outlet 22 when the shutter 15 has moved to its upper position, under the control of the oscillating switching relay RY1. Through this technique, the valve 15–17 can never fail in an open or unsafe manner since there is no direct connection possible between inlet and outlet, and the oscillating character of the valve itself serves to provide for self-checking thereof.

By adjusting the signal modification repetition rate, the delivery flow from the outlet 22 along path 22' to the product load or utilization device may be rendered continuous and relatively steady for given size conduits, storage member and pressure of product flow; it being necessary, for the attainment of this end, that there be adequate storage of product in, and delivery of product from, the storage means 30 during the time of the alinement of the passages A and B with respective openings 20–30 and 30–22, to insure such continuous output. Further to attain this result, a series-connected further storage member 30' may be inserted in the delivery path 22' to aid in smoothing or integrating the output flow.

It is not necessary that the valve be of the sliding type shown in FIG. 1, since the principles underlying the invention are equally applicable to other types of valving structures. Thus, for example, in the embodiment of FIG. 2, a rotary or arcuately operated valve is illustrated employing a pair of C-shaped passages A' and B' symmetrically disposed in a circular cross-section shutter 15' disposed to rotate within a similar-shaped housing 17'. The inlet 20 and outlet 22 are diametrically opposed and, in addition to the storage member 30 located substantially ninety degrees of rotation from the inlet 20, a diametrically opposed further storage member 30'' is provided. Alinement of the passages A' and B' to permit storage from the inlet 20 in either of the storage members 30 and 30'' and delivery of product therefrom to the outlet 22 (again without any possible direct communication between inlet and outlet) will thus take place twice per revolution of the shutter. Such revolving may be effected by any desired means, including a rotary member controlled by the loading suppression device 6 through any conventional linear-to-rotary motion converter, schematically represented by the axis 40.

In experimental operation, for example, a rotary-type valve was successfully operated continuously to deliver fluid at rotating rates ranging from one to many revolutions per second with storage chambers 30 and 30' formed of about one-inch pipe about eight inches long.

The external storage members 30 or 30'' may be supplemented by, or in some cases replaced by, appropriate internal volumes provided by the passages A' or B' themselves, with the same criteria of rate of repetitive positional orientation before discussed in connection with the embodiment of FIG. 1.

It may also be desirable to add a proportional control feature whereby the rate at which the product (such as fuel) is delivered is related to the difference between actual running conditions (e.g. furnace temperature) and the set or required value. In the system of FIG. 2, for example, this feature can readily be added by driving the valve shutter 15' at a rate which can be determined by any auxiliary conventional proportional controller. If the sampling rate between safe-unsafe conditions is made some function of the difference between desired and actual operating conditions of the system as a whole, this adjustment of the rate is all that is necessary for a proportional control system having fail-safe features.

Further modifications will occur to those skilled in the art, including the use of the valve apart from the electrical or other control circuit of FIG. 1 and the employment of any of electromagnetic, pneumatic, hydraulic, electrical, mechanical or similar valve-shutter moving mechanisms; and all such are considered to fall within the spirit and scope of the invention as defined in the appended claims.

What is claimed is:

1. A fail-safe automatic-checking signal transmission system having an input and an output and having means for applying to the input a principal signal, means for repetitively modifying said principal signal at a predetermined rate of repetition, and an output apparatus comprising switching means responsive to the recovery of the modifications of the principal signal in the output, and fail-safe product-delivery valving means having, in combination, a valve inlet for receiving the product from a source thereof, a valve outlet for delivering product from the valving means to a product utilization device, product storage means, position-orientable passage means intermediate the said inlet and outlet and shaped to permit connection between the inlet and the storage means in a first position and connection between the storage means and the outlet in a second position but preventing any direct communication through the passage means between the inlet and outlet, and means controlled by the said switching means for repetitively changing the orientation of the said passage means between the said first and second positions.

2. A system as claimed in claim 1 and in which the storage means is external to the valving means and the passage means thereof.

3. A system as claimed in claim 1 and in which the storage means is associated with the passage means within the valving means.

4. A system as claimed in claim 1 and in which the passage means is substantially linearly oscillated between the said first and second positions.

5. A system as claimed in claim 1 and in which the passage means is arcuately movable between the said first and second positions.

6. A system as claimed in claim 5 and in which the passage means is rotated periodically to assume the connections of the said first and second positions.

7. A system as claimed in claim 6 and in which a plurality of passage and storage means is provided to permit the connections of the said first and second positions to be effected more than once per revolution of the passage means.

8. A system as claimed in claim 1 and in which the outlet is connected with a further product-storage branch for smoothing the delivery of the product.

References Cited by the Examiner
UNITED STATES PATENTS

| | | | |
|---|---|---|---|
| 1,932,976 | 10/1933 | Lamb et al. | 222—1 X |
| 1,965,069 | 7/1934 | Cramer | 222—427 |
| 2,188,676 | 1/1940 | Crandall | 222—250 |
| 2,533,428 | 12/1950 | Carpenter | 222—386.5 X |
| 2,673,662 | 3/1954 | Bensinger | 222—428 X |
| 2,796,197 | 6/1957 | Griddle | 222—55 |
| 2,798,213 | 7/1957 | Rowell | 340—213 |
| 2,798,214 | 7/1957 | Rowell | 340—213 |
| 2,807,008 | 9/1957 | Rowell | 340—213 |
| 2,807,009 | 9/1957 | Rowell | 340—213 |
| 2,807,010 | 9/1957 | Rowell | 340—213 |
| 2,807,011 | 9/1957 | Rowell | 340—213 |
| 2,881,596 | 4/1959 | Sheen | 62—55 |
| 2,881,958 | 4/1959 | Sheen | 222—250 |
| 2,925,197 | 2/1960 | Frebel | 222—63 X |
| 3,038,638 | 6/1962 | Notter | 222—76 X |

RAPHAEL M. LUPO, *Primary Examiner.*